US011287549B2

(12) United States Patent
Kim et al.

(10) Patent No.: US 11,287,549 B2
(45) Date of Patent: Mar. 29, 2022

(54) APPARATUS AND METHOD FOR RADIO-SONDE TEMPERATURE AND HUMIDITY CALIBRATION USING UPPER AIR SIMULATION TECHNOLOGY

(71) Applicant: Korea Research Institute of Standards and Science, Daejeon (KR)

(72) Inventors: Yong-Gyoo Kim, Daejeon (KR); In-Seok Yang, Daejeon (KR); Sang-Bong Woo, Daejeon (KR); Byung-Il Choi, Daejeon (KR); Sang-Wook Lee, Daejeon (KR); Woong Kang, Daejeon (KR); Youn-Kyun Oh, Daejeon (KR); Sung-Hun Kim, Gyeonggi-do (KR); Seong-Chong Park, Daejeon (KR); Young-Hee Lee, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 611 days.

(21) Appl. No.: 16/358,858

(22) Filed: Mar. 20, 2019

(65) Prior Publication Data

US 2020/0124766 A1 Apr. 23, 2020

(30) Foreign Application Priority Data

Oct. 19, 2018 (KR) ........................ 10-2018-0125394

(51) Int. Cl.
*G01K 15/00* (2006.01)
*G01W 1/08* (2006.01)

(52) U.S. Cl.
CPC ............. *G01W 1/08* (2013.01); *G01K 15/005* (2013.01)

(58) Field of Classification Search
CPC ......... G01W 17/08; G01W 1/08; G01W 1/11; G01K 15/005; G01N 27/00
(Continued)

(56) References Cited

U.S. PATENT DOCUMENTS

| | | | | |
|---|---|---|---|---|
| 10,336,432 | B1 * | 7/2019 | Farley | B64B 1/40 |
| 2008/0072669 | A1 * | 3/2008 | Paukkunen | G01W 1/08 73/335.02 |

(Continued)

FOREIGN PATENT DOCUMENTS

| | | | |
|---|---|---|---|
| CN | 103675953 | A * | 3/2014 |
| JP | 2578349 | Y2 * | 8/1998 |

(Continued)

*Primary Examiner* — Gail Kaplan Verbitsky
(74) *Attorney, Agent, or Firm* — Akerman LLP

(57) ABSTRACT

The present invention relates to an apparatus for calibrating temperature and humidity of a radio-sonde to be adapted to the upper air environment using an upper air simulation chamber including: an isotemperature-isohumidity unit calibrating temperature and humidity measured via the radio-sonde; a sunlight generation unit coupled to the isotemperature-isohumidity unit and generating sunlight to be irradiated to the isotemperature-isohumidity unit; an air supply unit coupled to the isotemperature-isohumidity unit and controlling the pressure and temperature of atmospheric air, allowing supplying air to the isotemperature-isohumidity unit; a sonic nozzle coupled to the isotemperature-isohumidity unit and creating an air flow set at below a set pressure; and a vacuum pump coupled to the isotemperature-isohumidity unit and discharging air which penetrates the isotemperature-isohumidity unit.

12 Claims, 5 Drawing Sheets

START
S110 1. DETERMINING A CALIBRATION POINT AND HUMIDITY CONDITION
S210 2. INSTALLING RADIO-SONDE FOR CALIBRATION
S310 3. VACUUM EXHAUSTING THE INSIDE OF CALIBRATION CHAMBER
S410 4. SETTING A CALIBRATION TEMPERATION OF AND OPERATING AN ISOTEMPERATURE-ISOHUMIDITY CHAMBER
S510 5. OPERATING HUMID AIR GENERATOR OF ISOTEMPERATURE LIQUID BATH
S610 6. OPERATING A COMPRESSED AIR GENERATOR AND A DRY AIR GENERATOR
S710 7. VERIFYING REACHING TO STABILIZATION OF SATURATOR OF HUMID AIR GENERATOR
S810 8. SETTING CALIBRATION PRESSURE CONDITION AND OPERATING VACUUM PUMP
S910 9. MEASURING RADIO-SONDE INDICATION HUMIDITY
S1110 10. MEASURING REFERENCE HUMIDITY WITHIN FLOW STABILIZATION PIPE
S1210 11. COMPUTING RELATIVE HUMIDITY AT A CALIBRATION POINT
S1310 12. COMPUTING RELATIVE HUMIDITY DEVIATION (RADIO-SONDE INDICATING VALE - REFERENCE HUMIDITY VALUE)
S1410 13. CHANGING CALIBRATION POINT AND HUMIDITY AND REPEATING THE FOURTEEN STEP TO TWELFTH STEP
S1510 14. PREPARING A CALIBRATION REPORT
END

(58) Field of Classification Search
USPC ..................... 340/870.17; 702/3, 85, 99, 104
See application file for complete search history.

(56) References Cited

U.S. PATENT DOCUMENTS

2016/0274026 A1* 9/2016 Solheim .................. G01W 1/00
2021/0041299 A1* 2/2021 Solheim ................ G01J 5/0003

FOREIGN PATENT DOCUMENTS

KR 10-1653109 B1 9/2016
KR 101742906 B1 * 6/2017
RU 2966378 C2 * 3/2014
WO WO-2017002999 A1 * 1/2017 ............... G01K 7/16

* cited by examiner

【FIG. 1】
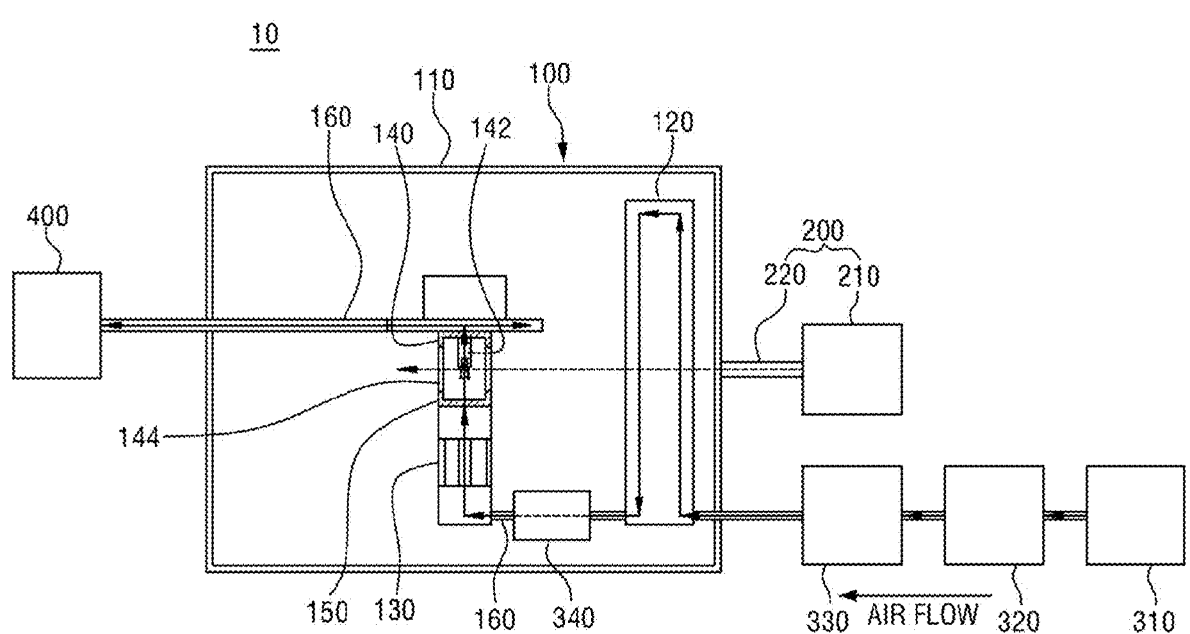

【FIG. 2】
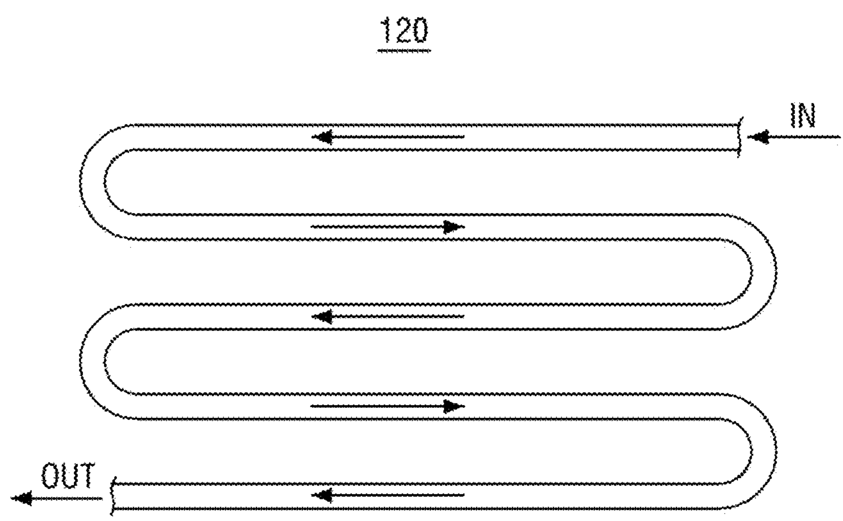
【FIG. 3A】
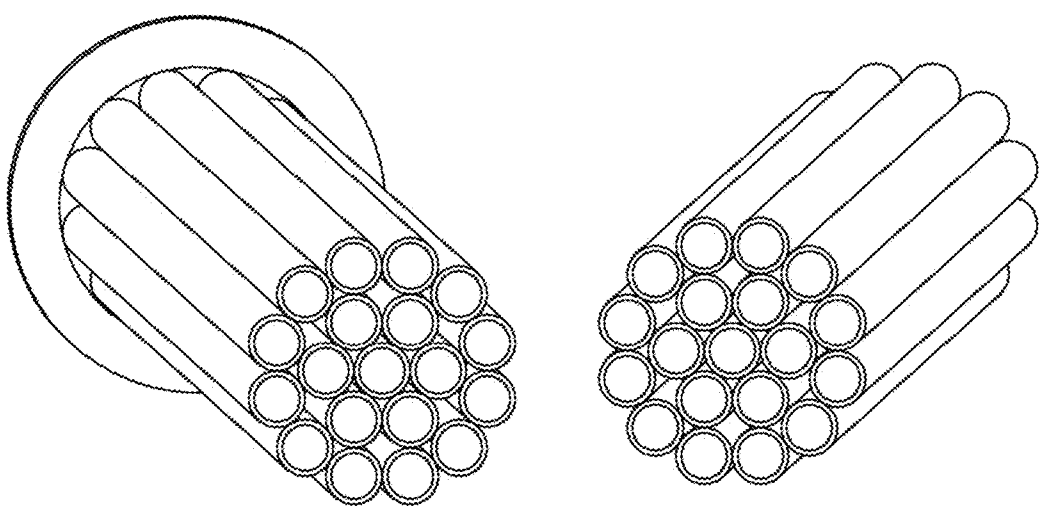

【FIG. 3B】
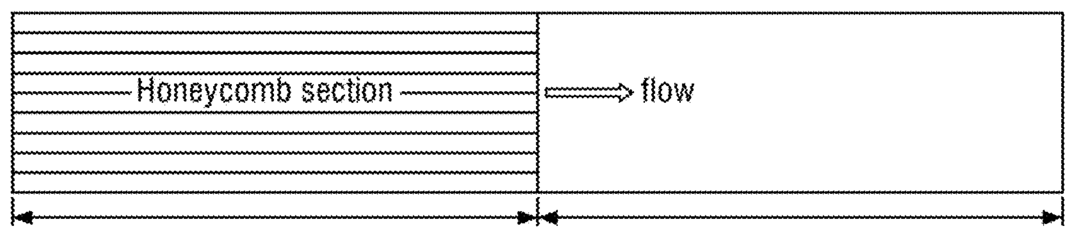
【FIG. 4】
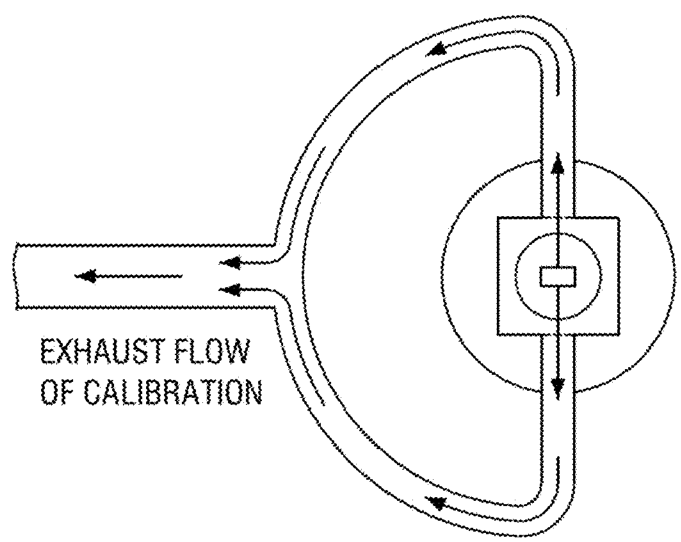

【FIG. 5】
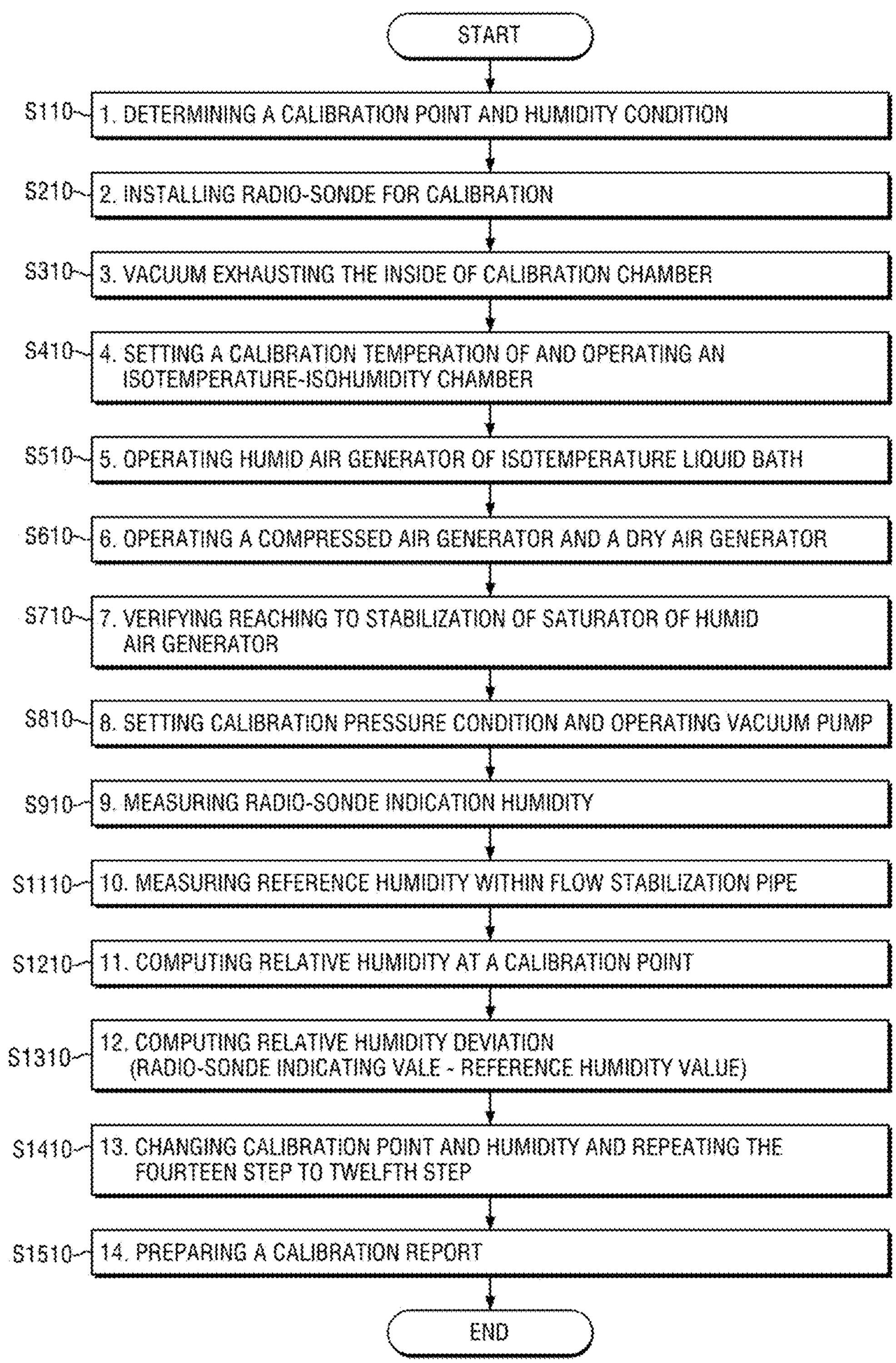

【FIG. 6】
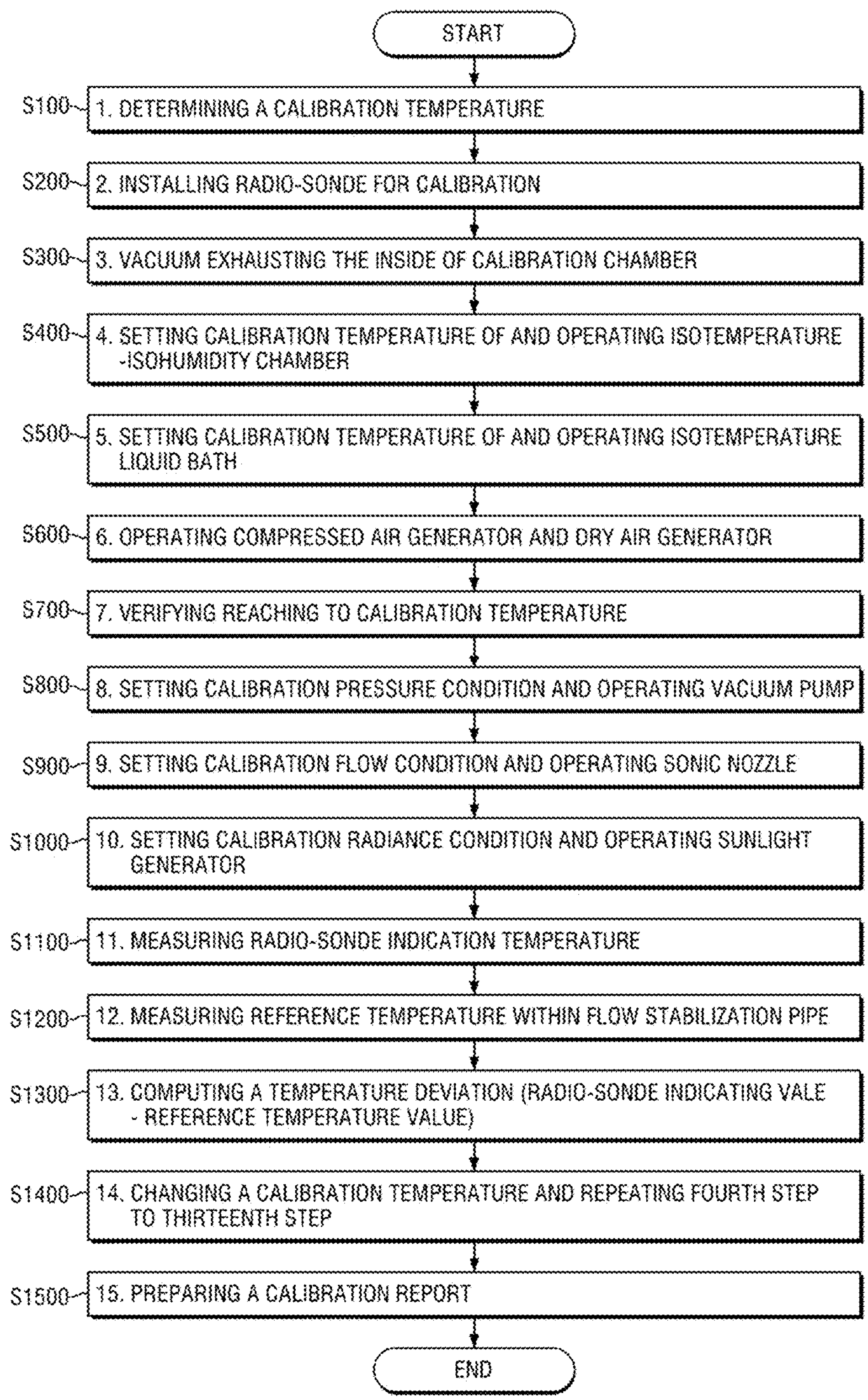

APPARATUS AND METHOD FOR RADIO-SONDE TEMPERATURE AND HUMIDITY CALIBRATION USING UPPER AIR SIMULATION TECHNOLOGY

CROSS-REFERENCE TO RELATED APPLICATION

The present application claims priority to and the benefit of Korean Patent Application No. 10-2018-0125394 filed in the Korean Intellectual Property Office on Oct. 19, 2018, the entire contents of which are incorporated herein by reference.

BACKGROUND

Technical Field

The present invention relates to an apparatus and a method for radio-sonde temperature and humidity calibration. In particular, the present invention relates to an apparatus and a method for radio-sonde temperature and humidity calibration using upper air simulation technology, allowing calibrating the temperature and humidity of a radio-sonde to be adapted to the upper air environment using a upper air simulation chamber.

Description of the Related Art

The atmosphere surrounding the Earth's surface closely relates to and obviously influences human life. A radio-sonde is one of observation apparatuses used for observing the structure and changes of the atmosphere. Such a radio-sonde is carried into the atmosphere by a balloon equipped with sensors for temperature, pressure, humidity and GPS and then transmits observed data at regular intervals of time, allowing identifying atmospheric conditions. The radio-sonde flying in the atmosphere measures temperature, pressure humidity, etc. directly and computes wind using a distance of the balloon blown for the preset period of time. A Long Range Navigation (Loran) method and a Global Positioning System (GPS) method are widely used for identifying locations of the radio-sonde. Such methods directly contact and observe the upper air, allowing providing high accuracies compared to the remote sensing equipment that observes upper atmospheric conditions using electromagnetic wave.

Commonly, the radio-sonde ascends to the stratosphere by a balloon, allowing observing upper atmospheric conditions such as pressure, temperature, humidity, etc. and then wirelessly transmitting observed data to a ground receiver. At this time, a conventional ground receiver, as a single channel receiver, has a 2 hour-observation cycle, allowing performing an observation of the upper atmosphere at a 2 hour-time interval at least. That is, when operating the radio-sonde on the site, there was no interference before starting observation. Then, if radio interference occurs in the middle of the observation, the observation should be suspended, incurring observation again and consequently serious monetary losses. Further, if blowing another radio-sonde before one radio-sonde falls off the ground, losing its functions, in order to avoid misrecognizing and receiving an electromagnetic wave of the radio-sonde blown first as observed data of the radio-sonde blown later there is a drawback that a time interval for blowing the radio-sonde cannot be shortened to be within 1 hour.

In addition, since conventional radio-sonde temperature and humidity calibration is performed under a room pressure condition of the laboratory on the ground. Such a condition is different from a low pressure condition of the upper air. Thus, such calibration has drawbacks, such as a low accuracy in calibration values and a difficulty in maintaining metrological traceability.

RELATED ART DOCUMENT

Patent Document

Korea Patent No. 10-1653109 (Title of Invention: APPARATUS AND METHOD FOR EVALUATING RADIO-SONDE BASED ON TEMPERATURE AND HUMIDITY)

SUMMARY OF THE INVENTION

Accordingly, in order to overcome the aforementioned drawbacks, the present invention relates to an apparatus and a method for radio-sonde temperature and humidity calibration using upper air simulation technology, allowing calibrating the temperature and humidity of a radio-sonde to be adapted to the upper air environment using a upper air simulation chamber. The upper air simulation chamber is configured to change temperature, pressure, wind speed and solar radiance in which the respective weather variables are capable of controlled independently, and to be retroactively applied to national standards, allowing such weather variables to accord with international standards.

Meanwhile, the present invention is not limited to the above-mentioned technical problems, and unless specifically stated otherwise herein, other technical problems will be clearly understood by those of ordinary skilled in the art from the following description.

According to first aspect of the present invention, an apparatus for calibrating the temperature and humidity of a radio-sonde to be adapted to the upper air environment using a upper air simulation chamber may include: an isotemperature-isohumidity unit calibrating temperature and humidity measured through the radio-sonde; a sunlight generating unit coupled to the isotemperature-isohumidity unit, allowing generating sunlight to be irradiated to the isotemperature-isohumidity unit; an air supply unit coupled to the isotemperature-isohumidity unit, allowing controlling pressure and temperature of air and supplying the isotemperature-isohumidity unit with pressure- and temperature-controlled air; a sonic nozzle coupled to the air supply unit, allowing creating an air flow set at below a preset pressure; and a vacuum pump coupled to the isotemperature-isohumidity unit, allowing discharging air which passes through the isotemperature-isohumidity unit to the outside.

According to the second aspect of the present invention, a method for radio-sonde temperature and humidity calibration using an apparatus for radio-sonde temperature and humidity calibration using upper air simulation technology may include: a first step of determining a calibration temperature, wherein a calibration temperature is determined according to a temperature used in the radio-sonde; a second step of installing a radio-sonde for calibration, wherein the radio-sonde for calibration is installed inside the a radio-sonde holder; a third step of vacuum-exhausting the inside of a calibration chamber, wherein a vacuum pump is operated after installing the radio-sonde so as to remove air completely from the calibration chamber; a fourth step of setting a calibration temperature of and operating an isotemperature-isohumidity chamber, wherein a temperature of an isotemperature-isohumidity chamber is set according to a calibration temperature and then the isotemperature-isohumidity chamber is operated so as to control air temperature; a fifth step of setting a calibration temperature of and operating an isotemperature liquid bath, wherein a temperature of an isotemperature liquid bath is set according to a calibration temperature and then the isotemperature liquid bath is operated, so as to control air temperature; a sixth step of operating a compressed air generator and a dry air generator, wherein a pipe on the side of a compressed air generator is opened and then a dry air generator is operated, allowing inflow of dry air; a seventh step of verifying whether to reach a calibration temperature, wherein it is verified whether temperatures of the isotemperature liquid bath and the isotemperature-isohumidity chamber reach a preset calibration temperature and then are stabilized; an eighth step of setting a calibration pressure condition and operating a vacuum pump, wherein a upper air pressure condition to be simulated for temperature measurement of the radio-sonde is set and then the vacuum pump is operated; a ninth step of setting a calibration flow condition and operating a sonic nozzle, wherein a flow condition of the upper air to be simulated for temperature measurement of the radio-sonde is set and then dry air flows into the sonic nozzle corresponding to the flow condition; a tenth step of setting a calibration radiance condition and operating a sunlight generator, wherein a solar radiance condition to be simulated for temperature measurement of the radio-sonde is set and then output of the sunlight generator is controlled according thereto, allowing irradiating sunlight to the calibration chamber; an eleventh step of measuring a radio-sonde indication temperature, wherein a temperature indicating value of the radio-sonde is measured after stabilizing temperature, pressure, flow and radiance; a twelfth step measuring a reference temperature within a flow stabilization pipe wherein an output temperature of a temperature sensor equipped to the flow stabilization pipe is measured simultaneously with the eleventh step; a thirteenth step of computing a temperature deviation, wherein the temperature deviation is computed by subtracting the reference temperature measured at the twelfth step from the temperature indicating vale of the radio-sonde measured at the eleventh step; a fourteenth step of changing a calibration temperature, wherein if there are several calibration points, the fourth step to the thirteenth step are performed repeatedly; and a fifteenth step of preparing a calibration report, wherein a calibration report is prepared by using a relation table of the reference temperature to the temperature deviation from the respective calibration temperatures.

According to one embodiment of the present invention, upper air environmental factors including temperature, humidity, pressure, wind, solar radiation, etc., may be controlled and measured independently on the ground. Measurement values per the respective upper air environmental factors are retroactive to relevant measurement references, allowing evaluating measurement validation of temperature and humidity measurement values of the radio-sonde for observing upper air.

In addition, it is possible to evaluate measurement validation of radiation temperature calibration value of the conventional radio-sonde according to heating a temperature sensor by solar radiation.

In addition, when calibrating a temperature sensor of a radio-sonde, the angle of a sensor boom to be exposed to sunlight is controlled, thereby evaluating the influence according to a solar altitude angle when launching the radio-sonde.

In addition, measurement values are retroactive to the measurement standard, allowing computing calibration values which are capable of being used for the measurement of reference temperature and humidity during international comparison of a radio-sonde.

In addition, a regular flow can be generated using a sonic nozzle, so as to simulate a regular ascending rate of a radio-sonde at below the atmospheric pressure, allowing simulation of an air flow having a regular flow at low temperature and pressure.

Meanwhile, the present invention is not limited to the above-mentioned effects, and unless specifically stated otherwise herein, other effects will be clearly understood by those of ordinary skilled in the art from the following description.

BRIEF DESCRIPTION OF THE DRAWINGS

The foregoing features of the present invention will become more fully apparent from the following description, taken in conjunction with the accompanying drawings. Understanding that these drawings depict only preferable embodiments of the invention and are, therefore, not to be considered limiting of its scope, the invention will be described with additional specificity and detail through use of the accompanying drawings in which:

FIG. 1 is an entire conceptual diagram showing a radio-sonde temperature and humidity calibration apparatus using upper air simulation technology according to the present invention.

FIG. 2 is a schematic diagram showing the air stabilization pipe.

FIG. 3*a* is a drawing showing a form of the flow stabilization pipe.

FIG. 3*b* is a drawing showing the concept of an air flow of the flow stabilization pipe.

FIG. 4 is a drawing showing an exhaust flow of the exhaust pipe schematically.

FIG. 5 is a first flow chart showing radio-sonde temperature and humidity calibration method using upper air simulation technology according to the present invention.

FIG. 6 is a second flowchart showing radio-sonde temperature and humidity calibration method using upper air simulation technology according to the present invention.

DETAILED DESCRIPTION OF THE EMBODIMENTS

Some embodiments of the present invention will be described in detail sufficient for one skilled in the art to practice the present invention by reference to the attached drawings. It is to be understood, however, that the embodiments are designed for the purpose of structural or functional explanation of the present invention only and not as definition of the limits of the present invention. That is, many changes and modifications may be made to the embodiments. Therefore, it is to be understood that the scope of the present invention may include equivalents capable of embodying the technical spirit thereof. Further, objects or effects of the present invention described herein do not mean that a particular embodiment includes either all these things or such effects only. It is, thus, to be understood not as definition of the limits of the present invention.

It is to be understood that the terms “first”, “second” etc. are referred to herein to distinguish one element from others only and not as definition of the limits of the present invention. For example, a first element may be referred to as a second element and similarly a second element may be also referred to as a first element. When referring that a certain element is coupled to another, it is to be understood that it may be coupled directly thereto or there may be another of elements in between. On the other hand, when referring that a certain element is directly coupled to another, it is to be understood that there are no elements in between. Meanwhile, other expressions, i.e. "between" and "directly between" or "neighboring" or "directly neighboring" are to be interpreted as the same.

It is to be understood that the singular form may include the plural form, unless otherwise meaning obviously different things contextually. The terms "include" or "have" intend to designate the existence of features, numbers, stages, operations, elements, parts or any combinations thereof. It is, however, to be understood not to exclude any possibilities of the existence or addition of one or more features, numbers, stages, operations, elements, parts or any combinations thereof in advance.

It is to be understood that all terms used herein may have the same meanings as those commonly understood by one skilled in the art, unless otherwise defined differently. It is to be interpreted that the terms defined in the dictionary commonly used correspond to the contextual meaning of related technical terms. It cannot be interpreted that such terms have either ideal or unduly formal meanings, unless otherwise defined obviously in the present invention.

FIG. 1 is an entire conceptual diagram showing a radio-sonde temperature and humidity calibration apparatus using upper air simulation technology according to the present invention. FIG. 2 is a schematic diagram showing the air stabilization pipe. FIG. 3*a* is a drawing showing a form of the flow stabilization pipe and FIG. 3*b* is a drawing showing the concept of an air flow of the flow stabilization pipe. FIG. 4 is a drawing showing an exhaust flow of the exhaust pipe schematically.

As illustrated in FIG. 1 to FIG. 4, according to the present invention, an apparatus for calibrating temperature and humidity of a radio-sonde to be adapted to the upper air environment using an upper air simulation chamber may include an isotemperature-isohumidity 100, a sunlight generation unit 200, an air supply unit 300 and a vacuum pump 400.

The isotemperature-isohumidity 100 may calibrate the temperature and humidity measured via a radio-sonde. The isotemperature-isohumidity 100 may include an isotemperature-isohumidity chamber 110, an air stabilization pipe 120, a sonic nozzle 340, a flow stabilization pipe 130, a calibration chamber 140, a radio-sonde holder 150 and an exhaust pipe 160.

The isotemperature-isohumidity chamber 110 is capable of storing the radio-sonde. Particularly, such an isotemperature-isohumidity chamber controls the temperature of various apparatuses and accessories required for radio-sonde calibration to be adapted for the steady temperature of the upper air, wherein the temperature may be controlled within the range of from −90° C. to 60° C. and the relative humidity may be also controlled within the range of 5 to 95% rh.

The air stabilization pipe 120 may be equipped to a portion of the isotemperature-isohumidity chamber, allowing the air temperature controlled in the air supply unit 300 to correspond with the temperature of the isotemperature-isohumidity chamber 110 through pipe arrangement.

The air stabilization pipe 120 may be arranged into a zigzag shape. Particularly, the air stabilization pipe 120 is a heat exchange device which arranged into a zigzag shape, allowing air temperature controlled in an isotemperature liquid bath 330 to correspond with the temperature of the isotemperature-isohumidity chamber 110, wherein such an air stabilization pipe may have a thickness of ¼ to ⅜ inches.

The sonic nozzle 340 may be equipped between the air stabilization pipe 120 and the flow stabilization pipe 130, allowing creating an air flow set at below a preset pressure. Particularly, the sonic nozzle 340 is an air flow control device, allowing creating a uniform air flow at a low pressure of 1 atmosphere and under, wherein a diameter of the sonic nozzle 340 may be controlled diversely according to the pressure to be implemented. For example, the sonic nozzle 340 may be composed of a set of 3 nozzles. That is, such a sonic nozzle may be composed of a first nozzle having a diameter of 0.4 mm for a pressure range of 10 to 50 hPa, a second nozzle having a diameter of 1.12 mm for a pressure range of 50 to 100 hPa and a third nozzle having a diameter of 3.2 mm for a pressure range of 100 to 1,000 hPa.

The flow stabilization pipe 130 may be equipped to a portion of the isotemperature-isohumidity chamber 110, allowing inducing structurally uniform spatial distribution for a set flow of air generated from the air supply unit. The flow stabilization pipe 130 may be equipped with at least one air flow homogenization module having a honeycomb shape, allowing homogenizing air flow. Particularly, the flow stabilization pipe 130 makes the spatial distribution for uniform flow of air generated through the sonic nozzle 340 to be homogenized, wherein an air flow homogenization module having a honey comb shape may be equipped thereto. Such a flow stabilization pipe may be equipped with a temperature sensor for measuring air temperature, a pressure gauge and a flow meter, wherein an alumina thin film dew point humidity sensor may be additionally attached thereto, allowing measuring the humidity.

The calibration chamber 140 may be equipped to the flow stabilization pipe 131 and coupled to a radio-sonde, allowing calibration of temperature and humidity. The calibration chamber 140 may include a sensor boom 142 and a crystal plate 144. Particularly, the calibration chamber 140 is equipped with the sensor boom 142 of the radio-sonde, allowing the calibration of temperature and humidity. Such a calibration chamber may be a square shape having a width of one side of 30 to 40 mm and total length of 50 to 150 mm. A temperature sensor for the measurement of air temperature and an illuminometer of the measurement of solar radiance may be equipped thereto, if necessary, detachably.

The sensor boom 142 may be equipped to a portion of the calibration chamber and a temperature sensor and a humidity sensor may be attached thereto. Particularly, the sensor boom 142 is a boom which is generally used for the radio-sonde and attached with a temperature sensor and a humidity sensor.

The crystal plate 144 is a transparent element forming an outer surface of the calibration chamber, allowing penetration of sunlight generated from the sunlight generation unit 200 to the sensor boom 142. Particularly, the crystal plate 144 is a transparent plate equipped, so as for sunlight to illuminate to a sensor, allowing simulating the effect by solar radiation of the radio-sonde temperature sensor, wherein the material of such a transparent plate may be quartz and the thickness and size thereof may be diverse according to the size of the calibration chamber.

The radio-sonde holder may store the radio-sonde which is coupled to the calibration chamber 140, allowing the movement thereof. The radio-sonde holder 150 may be equipped thereinside with a rotation motor, allowing rotating the radio-sonde through 360 degrees about a vertical direction thereof as a rotation axis. Particularly, the radio-sonde holder 150 is a holder which a radio-sonde module attached with the sensor boom 142 may be equipped to, allowing maintaining a pressure to be the same as that of the calibration chamber 140. Such a holder may be equipped thereinside with a rotation motor capable of rotating the radio-sonde through 360 degrees about a vertical direction thereof as a rotation axis, and control components. Further, a multipin feedthrough for vacuum is equipped thereto, allowing connecting a motor control electrode to the outside. Further, a feedthrough for measurement may be also equipped thereto, allowing the measurement of outputs of temperature and humidity.

The exhaust pipe 160 may be coupled to the calibration chamber 140, allowing inducing discharge of air flowed into the calibration chamber to the outside. The exhaust pipe 160 may be a structure which is divided into two at a upper surface of the calibration chamber 140 and then forms a whole again, allowing being coupled to the vacuum pump 400. Particularly, the exhaust pipe 160 may be, as an air discharging pipe that is equipped to discharge the air flowed into the calibration chamber 140 to the outside, divided into two at the upper surface of the calibration chamber 140 and then form a whole again, allowing being coupled to the vacuum pump 400.

Further, the present invention includes a plumbing pipe, allowing coupling the respective devices provided between a compressed air generator and the stabilization pipe 130. A thickness of such a plumbing pipe ranges between ¼ to ⅜ inches and may vary according to the purpose of use. The material of the plumbing pipe may include stainless steel and copper and the thickness thereof may be ¼ to ⅜ inches.

The sunlight generation unit 200 may be coupled to the isotemperature-isohumidity unit 100, allowing generating sunlight to be irradiated to the isotemperature-isohumidity unit 200. The sunlight generating unit 200 may include a sunlight generator 210 and a sunlight guide pipe 220.

The sunlight generator 210 may generate sunlight to be irradiated to the isotemperature-isohumidity unit for measuring temperature calibration effect of the radio-sonde by solar radiation.

The sunlight guide pipe 220 may be coupled to the sunlight generator 210 and the isotemperature-isohumidity unit 100, allowing sunlight generated from the sunlight generator 210 to be flowed into the isotemperature-isohumidity unit 100. Particularly, the sunlight generator 210 is an artificial solar simulator that irradiates sunlight to a sensor for measuring temperature calibration effect of the radio-sonde by solar radiation, and shows spectroscopic features similar to the respective wavelength features of sunlight. The generated sunlight is flowed from the outside into the isotemperature-isohumidity chamber 110, passes through the calibration chamber 140, and then is dispersed to disappear.

The sunlight guide 220 is a linear type of beam guide, allowing sunlight generated from the sunlight generator 210 to be flowed into the isotemperature-isohumidity chamber 110, wherein a long circular guide made from liquid crystal may be used.

The air supply unit 300 may be coupled to the isotemperature-isohumidity unit 100, allowing supplying the isotemperature-isohumidity unit 100 with air of which temperature and pressure are controlled from the atmosphere. The air supply unit 300 may include a compressed air generator 310, a dry air generator 320 and the isotemperature liquid bath 330.

The compressed air generator 310 may generate compressed air by compressing air to a preset pressure. Particularly, the compressed air generator may generate 5-7 atmospheres of compressed air by compressing general air.

The dry air generator 320 may remove moisture in compressed air generated from the compressed air generator, allowing drying to a preset temperature. That is, the dry air generator 320 removes moisture in compressed air, allowing generating dry air dried to a dew point of −90° C.

The isotemperature liquid bath 330 may change compressed air dried through the dry air generator into air of upper air temperature and humidity by heat-exchange and humidification. Particularly, the isotemperature liquid bath 300 is used to generate air of simulated upper air temperature and humidity and can be operated at the lowest temperature of −90° C., wherein a coil type of heat-exchanger for making the temperature of air the same as that of the isotemperature bath and a humidifier for generating and controlling humid air may be included thereinside.

The vacuum pump 400 may be coupled to the isotemperature-isohumidity unit 100, allowing discharging air which passed through the isotemperature-isohumidity unit to the outside.

FIG. 5 is a first flow chart showing radio-sonde temperature and humidity calibration method using upper air simulation technology according to the present invention, and FIG. 6 is a second flowchart showing radio-sonde temperature and humidity calibration method using upper air simulation technology according to the present invention.

As illustrated in FIG. 5, according to the present invention, a method for radio-sonde temperature and humidity calibration using an apparatus for radio-sonde temperature and humidity calibration using upper air simulation technology may include following 1 to 15 steps.

Step 1 is to determine a calibration temperature, wherein the calibration temperature is determined according to a temperature used in the radio-sonde.

Step 2 is to install a radio-sonde for calibration, wherein the radio-sonde for calibration is installed inside a radio-sonde holder 150.

Step 3 is to vacuum-exhaust the inside of a calibration chamber 140, wherein a vacuum pump 400 is operated after installing the radio-sonde so as to remove air completely from the calibration chamber 140.

Step 4 is to set a calibration temperature of and operating an isotemperature-isohumidity chamber 110, wherein a temperature of the isotemperature-isohumidity chamber 110 is set according to a calibration temperature and then the isotemperature-isohumidity chamber 110 is operated so as to control air temperature.

Step 5 is to set a calibration temperature of and operating an isotemperature liquid bath 330, wherein a temperature of the isotemperature liquid bath 330 is set according to a calibration temperature and then the isotemperature liquid bath 330 is operated, so as to control air temperature;

Step 6 is to operate a compressed air generator 310 and a dry air generator 320, wherein a pipe on the side of the compressed air generator 310 is opened and then the dry air generator 320 is operated, allowing inflow of dry air.

Step 7 is to verify reaching to a calibration temperature, wherein it is verified whether a temperatures of the isotemperature liquid bath 330 and the isotemperature-isohumidity chamber 110 reach to a preset calibration temperature and then are stabilized.

Step 8 is to set a calibration pressure condition and to operate a vacuum pump 400, wherein a upper air pressure condition to be simulated for temperature measurement of the radio-sonde is set and then the vacuum pump 400 is operated.

Step 9 is to set a calibration flow condition and to operate a sonic nozzle 340, wherein a flow condition of the upper air to be simulated for temperature measurement of the radio-sonde is set and then dry air flows into the sonic nozzle corresponding to the flow condition.

Step 10 is to set a calibration radiance condition and to operate a sunlight generator 210, wherein a solar radiance condition to be simulated for temperature measurement of the radio-sonde is set and then output of the sunlight generator 210 is controlled according thereto, allowing irradiating sunlight to the calibration chamber 140.

Step 11 is to measure a radio-sonde indication temperature, wherein a temperature indicating value of the radio-sonde is measured after stabilizing temperature, pressure, flow and radiance. The temperature indicating value may be communicated between the radio-sonde and a receiver by wireless RF communication. If wireless communication is not available, an indication value of a temperature sensor may be measured by using a temperature indicator after connecting a direct measurement circuit to the sensor boom of the radio-sonde. The measurement can be performed for 5 to 30 minutes, however, shorter is better. If necessary, changes in the indicating temperature may be measured by altering the surface area of the sensor boom 142 irradiated with solar radiation through altering the angle of the sensor boom 142 of the radio-sonde. Such a measurement is capable of evaluating the influence of radio-sonde temperature measurement values according to solar altitude angle.

Step 12 is to measure a reference temperature within a flow stabilization pipe 130 wherein an output temperature of a temperature sensor equipped to the flow stabilization pipe 130 is measured simultaneously with step 11.

Step 13 is to compute a temperature deviation, wherein the temperature deviation is computed by subtracting the reference temperature measured at step 12 from the temperature indicating vale of the radio-sonde measured at step 11.

Step 14 is to change a calibration temperature, wherein if there are several calibration points, step 4 to step 13 are performed repeatedly.

Step 15 is to prepare a calibration report, wherein a calibration report is prepared by using a relation table of the reference temperature to the temperature deviation from the respective calibration temperatures.

Further, as illustrated in FIG. 6, a second embodiment of the present invention may include following 1 to 14 steps.

Step 1 is to determine a calibration point and a humidity condition, wherein temperature and relative humidity measured by the radio-sonde are determined as temperature and relative humidity to be calibrated.

Step 2 is to install a radio-sonde for calibration, wherein the radio-sonde for calibration is installed inside a radio-sonde holder 150.

Step 3 is to vacuum-exhaust the inside of a calibration chamber 140, wherein a vacuum pump 400 is operated after installing the radio-sonde so as to remove air completely from the calibration chamber 140.

Step 4 is to set a calibration temperature of and operating an isotemperature-isohumidity chamber 110, wherein a temperature of the isotemperature-isohumidity chamber 110 is set according to a calibration temperature and then the isotemperature-isohumidity chamber 110 is operated so as to control air temperature.

Step 5 is to operate a humidifier of an isotemperature liquid bath, wherein the humidifier equipped to the isotemperature liquid bath is operated, so as to generate humid air to be flow into the calibration chamber.

Step 6 is to operate a compressed air generator 310 and a dry air generator 320, wherein a pipe on the side of the compressed air generator 310 is opened, the dry air generator is operated and then flow is controlled, allowing inflow of preset humid air into the calibration chamber.

Step 7 is to verify reaching to stabilization of a saturator of the humidifier, wherein it is verified whether humid air generated from the humidifier maintains a value set according to time.

Step 8 is to set a calibration pressure condition and to operate a vacuum pump 400, wherein a upper air pressure condition to be simulated for temperature measurement of the radio-sonde is set and then the vacuum pump 400 is operated.

Step 9 is to measure a radio-sonde indication humidity, wherein a humidity indicating value of the radio-sonde is measured after stabilizing temperature, pressure and flow;

Step 10 is to measure a reference humidity within a flow stabilization pipe 130, wherein an output humidity of a humidity sensor equipped to the flow stabilization pipe 130 is measured simultaneously with step 9.

Step 11 is to compute relative humidity at a calibration point, wherein the relative humidity value is computed corresponding to set temperature and pressure;

Step 12 is to compute a relative humidity deviation at a calibration point, wherein the humidity deviation is computed by subtracting the reference humidity measured at the tenth step from the humidity indicating value of the radio-sonde measured at the ninth step;

Step 13 is to change a calibration point and humidity and to repeat step 4 to step 12, wherein if there are several points of the calibration temperature and humidity condition, step 4 to step 12 are performed repeatedly.

Step 14 is to prepare a calibration report, wherein a calibration report is prepared by using a relation table of the reference relative humidity to the humidity deviation from the respective calibration temperatures.

Accordingly, the present invention is capable of controlling and measuring upper air environmental factors including temperature, humidity, pressure, wind, solar radiation, etc. on the ground. Measurement values per the respective upper air environmental factors are retroactive to relevant measurement references, allowing evaluating measurement validation of temperature and humidity measurement values of the radio-sonde for observing upper air.

Further, the present invention is capable of evaluating measurement validation of radiation temperature calibration value of the conventional radio-sonde per heating a temperature sensor by solar radiation.

Further, when calibrating a temperature sensor of a radio-sonde, the angle of a sensor boom to be exposed to sunlight is controlled, thereby evaluating the influence according to a solar altitude angle when launching the radio-sonde.

Further, measurement values are retroactive to the measurement standard, allowing computing calibration values which are capable of being used for the measurement of reference temperature and humidity during international comparison of a radio-sonde.

Further, a regular flow can be generated using a sonic nozzle, so as to simulate a regular ascending rate of a radio-sonde at below the atmospheric pressure, allowing simulation of an air flow having a regular flow at low temperature and pressure.

The detailed description of preferable embodiments of the present invention disclosed as the above is provided, allowing being embodied and implemented by those of ordinary skilled in the art. Even though describing referring to preferable embodiments of the present invention in the above, those of ordinary skilled in the art may understand that the present invention may be modified and changed within the scope of the present invention. For example, those of ordinary skilled in the art may use the respective elements described in the aforementioned embodiments by combination thereof. Therefore, the present invention is not limited to the embodiments disclosed herein, but intends to grant the widest scope corresponding to principals and novel features disclosed herein.

The present invention may be embodied in any other specific forms within the scope of the concept and essential features. Therefore, the above detailed description should not be interpreted restrictively in all aspects but considered as examples. The scope of the present invention should be determined by rational interpretation, and all modifications within the scope equivalent to the present invention should be included in the present invention. The present invention is not limited to the embodiments disclosed herein, but intends to grant the largest scope corresponding to principals and novel features disclosed herein. Further, embodiments may be configured by combination of claims which are not explicitly in citation relation with the scope of claimed inventions, or may be included as new claims by amendments after filing an application.

DESCRIPTION OF SYMBOLS

10: apparatus for radio-sonde temperature and humidity calibration
100: isotemperature-isohumidity unit
110: isotemperature-isohumidity chamber
120: air stabilization pipe
130: flow stabilization pipe
140: calibration chamber
142: sensor boom
144: crystal plate
150: radio-sonde holder
160: exhaust pipe
200: sunlight generation unit
210: sunlight generator
220: sunlight guide pipe
300: air supply unit
310: compressed air generator
320: dry air generator
330: isotemperature liquid bath
340: sonic nozzle
400: vacuum pump

What is claimed is:

1. An apparatus and a method for radio-sonde temperature and humidity calibration using upper air simulation technology, wherein the apparatus allowing calibrating the temperature and humidity of a radio-sonde to be adapted to the upper air environment using a upper air simulation chamber comprises:

an isotemperature-isohumidity unit calibrating temperature and humidity measured through the radio-sonde;

a sunlight generating unit coupled to the isotemperature-isohumidity unit, allowing generating sunlight to be irradiated to the isotemperature-isohumidity unit;

an air supply unit coupled to the isotemperature-isohumidity unit, allowing controlling pressure and temperature of air and supplying the isotemperature-isohumidity unit with pressure- and temperature-controlled air;

a sonic nozzle coupled to the air supply unit, allowing creating an air flow set at below a preset pressure; and a vacuum pump coupled to the isotemperature-isohumidity unit, allowing discharging air which passed through the isotemperature-isohumidity unit to the outside.

2. The apparatus for radio-sonde temperature and humidity calibration using upper air simulation technology of claim 1, wherein the isotemperature-isohumidity unit comprises:

an isotemperature-isohumidity chamber storing the radio-sonde;

an air stabilization pipe equipped to a portion of the isotemperature-isohumidity chamber, allowing air temperature controlled in the air supply unit to correspond with temperature of the isotemperature-isohumidity chamber through pipe arrangement;

a flow stabilization pipe equipped to a portion of the isotemperature-isohumidity chamber, allowing inducing structurally uniform spatial distribution for a set flow of air generated from the air supply unit;

a calibration chamber equipped to the flow stabilization pipe and coupled to the radio-sonde, allowing temperature and humidity calibration;

a radio-sonde holder storing the radio-sonde which is coupled to the calibration chamber; and an exhaust pipe coupled to the calibration chamber, allowing inducing discharge of air flowed into the calibration chamber to the outside.

3. The apparatus for radio-sonde temperature and humidity calibration using upper air simulation technology of claim 1, wherein the calibration chamber comprises:

a sensor boom equipped to a portion of the calibration chamber and attached with a temperature sensor and a humidity sensor; and a transparent crystal plate forming an outer surface of the calibration chamber, allowing penetration of sunlight generated from the sunlight generation unit to the sensor boom.

4. The apparatus for radio-sonde temperature and humidity calibration using upper air simulation technology of claim 2, wherein the flow stabilization pipe is equipped with at least one air flow homogenization module having a honeycomb shape, allowing homogenizing air flow.

5. The apparatus for radio-sonde temperature and humidity calibration using upper air simulation technology of claim 1, wherein the sunlight generation unit comprises:

a sunlight generator generating sunlight to be irradiated to the isotemperature-isohumidity unit, allowing measuring temperature calibration effect of the radio-sonde by solar radiation; and a sunlight guide pipe coupled to the sunlight generator and the isotemperature-isohumidity unit, allowing sunlight generated from the sunlight generator to be flowed into the isotemperature-isohumidity unit.

6. The apparatus for radio-sonde temperature and humidity calibration using upper air simulation technology of claim 1, wherein the air supply unit comprises:

a compressed air generator compressing air to a preset pressure, allowing generating compressed air;

a dry air generator removing moisture in compressed air generated from the compressed air generator, allowing drying to a preset temperature; and an isotemperature liquid bath changing compressed air dried through the dry air generator into air of upper air temperature and humidity by heat-exchange and humidification.

7. The apparatus for radio-sonde temperature and humidity calibration using upper air simulation technology of claim 1, wherein the sonic nozzle is composed of:

a first nozzle having a diameter of 0.4 mm for a pressure range of 10 to 50 hPa;

a second nozzle having a diameter of 1.12 mm for a pressure range of 50 to 100 hPa; and a third nozzle having a diameter of 3.2 mm for a pressure range of 100 to 1,000 hPa.

8. The apparatus for radio-sonde temperature and humidity calibration using upper air simulation technology of claim 2, wherein the air stabilization pipe is arranged into a zigzag shape, allowing air temperature to correspond with temperature of the isotemperature-isohumidity chamber.

9. The apparatus for radio-sonde temperature and humidity calibration using upper air simulation technology of claim 2, wherein the radio-sonde holder is equipped with a rotation motor, allowing rotating the radio-sonde through 360 degrees about a vertical direction thereof as a rotation axis.

10. The apparatus for radio-sonde temperature and humidity calibration using upper air simulation technology of claim 2, wherein the exhaust pipe is divided into two at a upper surface of the calibration chamber and then forms a whole again, allowing being coupled to the vacuum pump.

11. A method for radio-sonde temperature and humidity calibration using an apparatus for radio-sonde temperature and humidity calibration using upper air simulation technology comprises:

a first step of determining a calibration temperature, wherein a calibration temperature is determined according to a temperature used in the radio-sonde;

a second step of installing a radio-sonde for calibration, wherein the radio-sonde for calibration is installed inside the a radio-sonde holder;

a third step of vacuum-exhausting the inside of a calibration chamber, wherein a vacuum pump is operated after installing the radio-sonde so as to remove air completely from the calibration chamber;

a fourth step of setting a calibration temperature of and operating an isotemperature-isohumidity chamber, wherein a temperature of an isotemperature-isohumidity chamber is set according to a calibration temperature and then the isotemperature-isohumidity chamber is operated so as to control air temperature;

a fifth step of setting a calibration temperature of and operating an isotemperature liquid bath, wherein a temperature of an isotemperature liquid bath is set according to a calibration temperature and then the isotemperature liquid bath is operated, so as to control air temperature;

a sixth step of operating a compressed air generator and a dry air generator, wherein a pipe on the side of a compressed air generator is opened and then a dry air generator is operated, allowing inflow of dry air;

a seventh step of verifying whether to reach a calibration temperature, wherein it is verified whether temperatures of the isotemperature liquid bath and the isotemperature-isohumidity chamber reach a preset calibration temperature and then are stabilized;

an eighth step of setting a calibration pressure condition and operating a vacuum pump, wherein a upper air pressure condition to be simulated for temperature measurement of the radio-sonde is set and then the vacuum pump is operated;

a ninth step of setting a calibration flow condition and operating a sonic nozzle, wherein a flow condition of the upper air to be simulated for temperature measurement of the radio-sonde is set and then dry air flows into the sonic nozzle corresponding to the flow condition;

a tenth step of setting a calibration radiance condition and operating a sunlight generator, wherein a solar radiance condition to be simulated for temperature measurement of the radio-sonde is set and then output of the sunlight generator is controlled according thereto, allowing irradiating sunlight to the calibration chamber;

an eleventh step of measuring a radio-sonde indication temperature, wherein a temperature indicating value of the radio-sonde is measured after stabilizing temperature, pressure, flow and radiance;

a twelfth step measuring a reference temperature within a flow stabilization pipe wherein an output temperature of a temperature sensor equipped to the flow stabilization pipe is measured simultaneously with the eleventh step;

a thirteenth step of computing a temperature deviation, wherein the temperature deviation is computed by subtracting the reference temperature measured at the twelfth step from the temperature indicating vale of the radio-sonde measured at the eleventh step;

a fourteenth step of changing a calibration temperature, wherein if there are several calibration points, the fourth step to the thirteenth step are performed repeatedly; and a fifteenth step of preparing a calibration report, wherein a calibration report is prepared by using a relation table of the reference temperature to the temperature deviation from the respective calibration temperatures.

12. A method for radio-sonde temperature and humidity calibration using an apparatus for radio-sonde temperature and humidity calibration using upper air simulation technology comprises:

a first step of determining a calibration point and a humidity condition, wherein temperature and relative humidity measured by the radio-sonde are determined as temperature and relative humidity to be calibrated;

a second step of installing a radio-sonde for calibration, wherein the radio-sonde for calibration is installed inside the a radio-sonde holder;

a third step of vacuum-exhausting the inside of a calibration chamber, wherein a vacuum pump is operated after installing the radio-sonde so as to remove air completely from the calibration chamber;

a fourth step of setting a calibration temperature of and operating an isotemperature-isohumidity chamber, wherein a temperature of an isotemperature-isohumidity chamber is set according to a calibration temperature and then the isotemperature-isohumidity chamber is operated so as to control air temperature;

a fifth step of operating a humidifier of an isotemperature liquid bath, wherein the humidifier equipped to the isotemperature liquid bath is operated, so as to generate humid air to be flow into the calibration chamber;

a sixth step of operating a compressed air generator and a dry air generator, wherein a pipe on the side of the compressed air generator is opened, the dry air generator is operated and then flow is controlled, allowing inflow of preset humid air into the calibration chamber;

a seventh step of verifying whether to reach stabilization of a saturator of the humidifier, wherein it is verified whether humid air generated from the humidifier maintains a value set according to time;

an eighth step of setting a calibration pressure condition and operating a vacuum pump, wherein a upper air pressure condition to be simulated for temperature measurement of the radio-sonde is set and then the vacuum pump is operated;

a ninth step of measuring a radio-sonde indication humidity, wherein a humidity indicating value of the radio-sonde is measured after stabilizing temperature, pressure and flow;

a tenth step of measuring a reference humidity within a flow stabilization pipe, wherein an output humidity of a humidity sensor equipped to the flow stabilization pipe is measured simultaneously with the ninth step;

an eleventh step of computing relative humidity at a calibration point, wherein the relative humidity value is computed corresponding to set temperature and pressure;

a twelfth step of computing a relative humidity deviation at a calibration point, wherein the humidity deviation is computed by subtracting the reference humidity measured at the tenth step from the humidity indicating value of the radio-sonde measured at the ninth step;

a thirteenth step of changing a calibration point and humidity and repeating the fourth to the twelfth step, wherein if there are several points of the calibration temperature and humidity condition, the fourth to the twelfth step are performed repeatedly; and a fourteenth step of preparing a calibration report, wherein the calibration report is prepared by using a relation table of the reference relative humidity to the humidity deviation from the respective calibration temperatures.

* * * * *